(12) United States Patent
Kumagai et al.

(10) Patent No.: US 8,934,009 B2
(45) Date of Patent: Jan. 13, 2015

(54) MEASURING METHOD AND MEASURING DEVICE

(75) Inventors: Kaoru Kumagai, Tokyo-to (JP); Fumio Ohtomo, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 503 days.

(21) Appl. No.: 13/182,667

(22) Filed: Jul. 14, 2011

(65) Prior Publication Data
US 2012/0057021 A1 Mar. 8, 2012

(30) Foreign Application Priority Data
Sep. 2, 2010 (JP) ................................ 2010-196485

(51) Int. Cl.
*G01C 3/00* (2006.01)
*H04N 7/18* (2006.01)
*G06K 9/00* (2006.01)
*G01C 3/08* (2006.01)
G01B 11/02 (2006.01)
*G01C 15/00* (2006.01)

(52) U.S. Cl.
CPC ................ *G01C 3/08* (2013.01); *G01B 11/022* (2013.01); *H04N 7/18* (2013.01); *G01C 15/00* (2013.01); *G01C 15/004* (2013.01); *G01C 3/00* (2013.01)
USPC .......................................... 348/135; 382/106

(58) Field of Classification Search
CPC ........ G01C 3/08; G01C 15/00; G01C 15/004; G01C 3/00; G01C 11/025; G01C 11/06; G01B 11/022; H04N 7/18
See application file for complete search history.

(56) References Cited

U.S. PATENT DOCUMENTS

| 3,644,043 A | 2/1972 | Jones et al. |
| 4,717,251 A | 1/1988 | Wells et al. |

(Continued)

FOREIGN PATENT DOCUMENTS

| CN | 1445509 A | 10/2003 |
| CN | 1896686 A | 1/2007 |

(Continued)

OTHER PUBLICATIONS

3rd Tech, Inc., DeltaSphere-3000 Laser 3D Scene Digitizer Brochure, Jun. 22, 2000, 2 pgs.

(Continued)

*Primary Examiner* — Sath V Perungavoor
*Assistant Examiner* — Jill Sechser
(74) *Attorney, Agent, or Firm* — Nields, Lemack & Frame, LLC

(57) ABSTRACT

The invention provides a measuring device, comprising a distance measuring unit 8 for performing distance measurement on a measuring point by projecting a distance measuring light and by receiving a reflected distance measuring light from the measuring point, an image pickup unit 7 for acquiring a digital image of a measurement range, a distance measuring optical axis deflecting unit 16 for deflecting a distance measuring optical axis of the distance measuring light, an angle measuring unit 9 for measuring an angle of the distance measuring optical axis, an image processing unit 14 for extracting the measuring point through image processing of the digital image, and a control arithmetic unit 21, wherein the control arithmetic unit detects an angle of the measuring point on the digital image, controls the distance measuring optical axis deflecting unit based on the detected angle, directs the distance measuring optical axis toward the measuring point one after another and measures a distance to the measuring point.

11 Claims, 6 Drawing Sheets

(56) References Cited

U.S. PATENT DOCUMENTS

| | | |
|---|---|---|
| 4,802,757 A | 2/1989 | Pleitner et al. |
| 5,098,185 A | 3/1992 | Watanabe et al. |
| 5,247,356 A | 9/1993 | Ciampa |
| 5,361,217 A | 11/1994 | Makimura et al. |
| 5,539,513 A | 7/1996 | Dunne |
| 5,548,409 A | 8/1996 | Ohta et al. |
| 5,647,015 A | 7/1997 | Choate et al. |
| 5,671,451 A | 9/1997 | Takahashi et al. |
| 5,699,149 A | 12/1997 | Kuroda et al. |
| 5,699,444 A | 12/1997 | Palm |
| 5,913,078 A | 6/1999 | Kimura et al. |
| 5,949,529 A | 9/1999 | Dunne et al. |
| 5,988,862 A | 11/1999 | Kacyra et al. |
| 6,025,790 A | 2/2000 | Saneyoshi |
| 6,093,928 A | 7/2000 | Ohtomo et al. |
| 6,246,468 B1 | 6/2001 | Dimsdale |
| 6,396,571 B2 | 5/2002 | Ohtomo et al. |
| 6,473,716 B1 | 10/2002 | Ohishi et al. |
| 6,480,148 B1 | 11/2002 | Wilson et al. |
| 6,563,574 B2 | 5/2003 | Ohtomo et al. |
| 6,643,004 B2 | 11/2003 | Detweiler et al. |
| 6,859,269 B2 | 2/2005 | Ohtomo et al. |
| 7,086,162 B2 * | 8/2006 | Tyroler ............ 33/277 |
| 7,256,900 B1 | 8/2007 | Hanaoka |
| 7,689,032 B2 | 3/2010 | Strassenburg-Kleciak |
| 7,804,498 B1 | 9/2010 | Graham et al. |
| 7,804,996 B2 | 9/2010 | Ohtomo et al. |
| 7,933,001 B2 | 4/2011 | Otani et al. |
| 8,045,762 B2 | 10/2011 | Otani et al. |
| 8,280,677 B2 | 10/2012 | Otani et al. |
| 8,319,952 B2 | 11/2012 | Otani et al. |
| 2001/0012016 A1 | 8/2001 | Ide et al. |
| 2003/0065446 A1 | 4/2003 | Ootomo et al. |
| 2003/0105400 A1 | 6/2003 | Yawata et al. |
| 2003/0137449 A1 | 7/2003 | Vashisth et al. |
| 2003/0179361 A1 | 9/2003 | Ohtomo et al. |
| 2004/0037451 A1 | 2/2004 | Kim et al. |
| 2005/0172503 A1 | 8/2005 | Kumagai et al. |
| 2005/0213808 A1 | 9/2005 | Ohtomo et al. |
| 2006/0044546 A1 | 3/2006 | Lewin et al. |
| 2006/0158423 A1 | 7/2006 | Kern et al. |
| 2006/0167648 A1 | 7/2006 | Ohtani |
| 2006/0188143 A1 | 8/2006 | Strassenburg-Kleciak |
| 2006/0192946 A1 | 8/2006 | Walser |
| 2006/0204232 A1 | 9/2006 | Weinberg et al. |
| 2007/0008515 A1 * | 1/2007 | Otani et al. ............ 356/5.02 |
| 2007/0010924 A1 | 1/2007 | Otani et al. |
| 2007/0133012 A1 | 6/2007 | Euler |
| 2007/0288197 A1 | 12/2007 | Martin |
| 2008/0007711 A1 * | 1/2008 | Liu ............ 356/5.11 |
| 2008/0075326 A1 * | 3/2008 | Otani et al. ............ 382/106 |
| 2008/0205707 A1 | 8/2008 | Braunecker et al. |
| 2008/0279447 A1 | 11/2008 | Friedlander et al. |
| 2009/0022369 A1 | 1/2009 | Satoh et al. |
| 2009/0222237 A1 | 9/2009 | Otani et al. |
| 2009/0225161 A1 | 9/2009 | Otani et al. |
| 2009/0241358 A1 | 10/2009 | Ohtomo et al. |
| 2011/0096319 A1 | 4/2011 | Otani et al. |

FOREIGN PATENT DOCUMENTS

| | | |
|---|---|---|
| EP | 0542561 A1 | 5/1993 |
| EP | 1176393 A2 | 1/2002 |
| EP | 1219925 A2 | 7/2002 |
| EP | 1544800 A2 | 6/2005 |
| EP | 1615051 A1 | 1/2006 |
| EP | 1662228 A1 | 5/2006 |
| EP | 1744122 A2 | 1/2007 |
| EP | 1903303 A2 | 3/2008 |
| EP | 2071283 A2 | 6/2009 |
| JP | 1-184411 A | 7/1989 |
| JP | 7-4961 A | 1/1995 |
| JP | 9-210649 A | 8/1997 |
| JP | 10-239055 A | 9/1998 |
| JP | 10-246628 A | 9/1998 |
| JP | 11-148822 A | 6/1999 |
| JP | 11-153430 A | 6/1999 |
| JP | 2000-131065 A | 5/2000 |
| JP | 2000-171249 A | 6/2000 |
| JP | 2001-503134 A | 3/2001 |
| JP | 2001-91253 A | 4/2001 |
| JP | 2001-183108 A | 7/2001 |
| JP | 2002-39748 A | 2/2002 |
| JP | 2002-131057 A | 5/2002 |
| JP | 2002-202126 A | 7/2002 |
| JP | 2002-271654 A | 9/2002 |
| JP | 2002-352224 A | 12/2002 |
| JP | 2003-114126 A | 4/2003 |
| JP | 2003-269958 A | 9/2003 |
| JP | 2004-32286 A | 1/2004 |
| JP | 2004-37424 A | 2/2004 |
| JP | 2004-93504 A | 3/2004 |
| JP | 2004-163292 A | 6/2004 |
| JP | 2004-177502 A | 6/2004 |
| JP | 2004-251875 A | 9/2004 |
| JP | 2004-317237 A | 11/2004 |
| JP | 2005-283221 A | 10/2005 |
| JP | 2006-10376 A | 1/2006 |
| JP | 2006-503275 A | 1/2006 |
| JP | 2007-248156 A | 9/2007 |
| JP | 2008-527360 A | 7/2008 |
| JP | 2008-268004 A | 11/2008 |
| WO | 98/10246 A1 | 3/1998 |
| WO | 01/31290 A2 | 5/2001 |
| WO | 2004/083779 A1 | 9/2004 |
| WO | 2004/083795 A2 | 9/2004 |
| WO | 2006/075017 A1 | 7/2006 |

OTHER PUBLICATIONS

Honeywell, 3-Axis Compass Sensor Set/HMC 1055 Brochure, 2009, 1 page.

European communication dated Jun. 5, 2014 in corresponding European patent application No. EP 11172717.

Japanese communication dated May 27, 2014 in corresponding Japanese patent application No. JP 2010-196485.

* cited by examiner

FIG. 5A
FIG. 5B
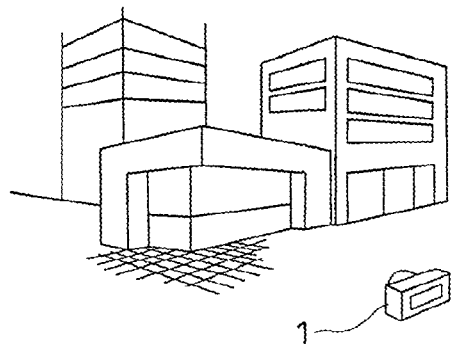
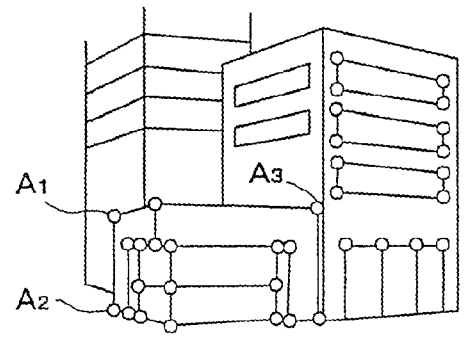
FIG. 6
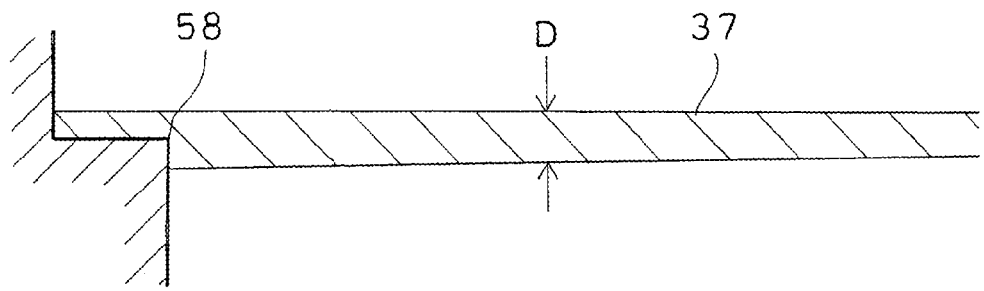
FIG. 7A
FIG. 7B
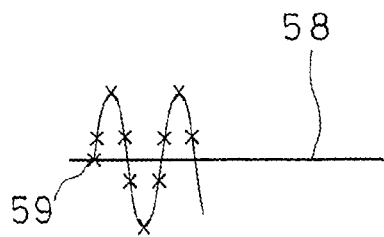
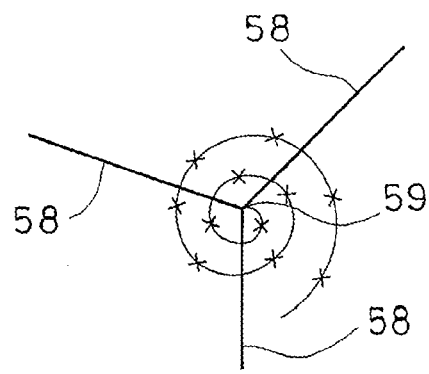

MEASURING METHOD AND MEASURING DEVICE

BACKGROUND OF THE INVENTION

The present invention relates to a measuring method and a measuring device, by which it is possible to acquire image in a measurement range as required and also to measure a multiple number of measuring points in the measurement range in simple and easy manner.

In the past, in case where three-dimensional data of an object to be measured are acquired, measurement has been performed by using a laser scanner or a total station. The laser scanner enables the measurement of a great number of measuring points at high speed, while the laser scanner requires higher cost.

Further, the measurement is carried out by the total station, while a measuring operator confirms the measuring points one by one. As a result, there is a problem that the measuring operator is required and much time is required for the measurement operation.

SUMMARY OF THE INVENTION

It is an object of the present invention to provide a measuring method and a measuring device, by which it is possible to measure a number of measuring points within a measurement range as required automatically, in simple manner, and at high speed.

To attain the above object, the present invention provides a measuring method by using a measuring device, which comprises a distance measuring unit for performing distance measurement on a measuring point by projecting a distance measuring light and by receiving a reflected distance measuring light from the measuring point, an image pickup unit for acquiring a digital image of a measurement range, a distance measuring optical axis deflecting unit for deflecting a distance measuring optical axis of the distance measuring light, and an image processing unit for extracting the measuring point by image processing of the digital image, comprising a step of acquiring a digital image of the measurement range, a step of extracting the measuring point through image processing of the acquired digital image, a step of measuring an angle of each of the measuring points from the image, and a step of directing the distance measuring optical axis to each of the measuring points one after another based on the result of angle measurement, and of measuring a distance to each of the measuring points.

Also, the invention provides the measuring method as described above, wherein the image pickup unit has a reference optical axis, and the distance measuring optical axis is deflected with respect to the reference optical axis, and measurement is performed on the measuring point within the measurement range in a condition that the reference optical axis is fixed.

Further, the present invention provides a measuring method, wherein a distance measurement is performed while micro-scanning of the distance measuring optical axis is performed around the measuring point.

Also, the present invention provides a measuring device, comprising a distance measuring unit for performing distance measurement on a measuring point by projecting a distance measuring light and by receiving a reflected distance measuring light from the measuring point, an image pickup unit for acquiring a digital image of a measurement range, a distance measuring optical axis deflecting unit for deflecting a distance measuring optical axis of the distance measuring light, an angle measuring unit for measuring an angle of the distance measuring optical axis, an image processing unit for extracting the measuring point through image processing of the digital image, and a control arithmetic unit, wherein the control arithmetic unit detects an angle of the measuring point on the digital image, controls the distance measuring optical axis deflecting unit based on the detected angle, directs the distance measuring optical axis toward the measuring point one after another and measures a distance to the measuring point.

Further, the invention provides the measuring device as described above, wherein the image pickup unit has a reference optical axis, and the distance measuring optical axis deflecting unit deflects the distance measuring optical axis with respect to the reference optical axis.

Also, the invention provides the measuring device as described above, wherein the distance measuring optical axis deflecting unit is a pair of MEMS mirrors provided at positions opposite to each other on the distance measuring optical axis, and the pair of MEMS mirrors have tilting direction deviated by 90° from each other.

Further, the invention provides the measuring device as described above, wherein the angle measuring unit has a luminous flux splitting means disposed on the distance measuring optical axis and a two-dimensional position detecting element for receiving the luminous flux thus split, wherein the two-dimensional position detecting element has a coordinate system having a point to match the distance measuring optical axis as an origin, and by detecting a position of the split luminous flux in the coordinate system, detects a deflection angle and a deflecting direction of the distance measuring optical axis.

Also, the invention provides the measuring device as described above, further comprising a display unit, wherein a digital image of the measurement range is displayed on the display unit, the extracted measuring point are disposed in superimposed manner on the digital image, and a measuring point not yet measured and a measuring point already measured are discriminated from each other and are displayed.

Further, the invention provides the measuring device as described above, further comprising a display unit, wherein the distance measuring light is a visible light, a digital image of the measurement range is displayed on the display unit, and a distance measuring light to be projected to the measuring point is displayed on the digital image.

Also, the invention provides the measuring device as described above, wherein the distance measuring unit has the distance measuring optical axis, the image pickup unit has a reference optical axis, wherein the distance measuring optical axis and the reference optical axis are disposed in a fixed relation with each other, the distance measuring optical axis and the reference optical axis are integrally deflected, and the distance measuring optical axis is directed to the measuring point.

Further, the invention provides the measuring device as described above, wherein an optical axis of the image pickup unit commonly shares the distance measuring optical axis, a deflection mirror is installed on the optical axis portion commonly shared, and when the deflection mirror is rotated in horizontal direction and is rotated in vertical direction, the distance measuring optical axis is deflected.

The present invention provides a measuring method by using a measuring device, which comprises a distance measuring unit for performing distance measurement on a measuring point by projecting a distance measuring light and by receiving a reflected distance measuring light from the measuring point, an image pickup unit for acquiring a digital image of a measurement range, a distance measuring optical axis deflecting unit for deflecting a distance measuring optical axis of the distance measuring light, and an image processing unit for extracting the measuring point by image processing of the digital image, comprising a step of acquiring a digital image of the measurement range, a step of extracting the measuring point through image processing of the acquired digital image, a step of measuring an angle of each of the measuring points from the image, and a step of directing the distance measuring optical axis to each of the measuring points one after another based on the result of angle measurement, and of measuring a distance to each of the measuring points. As a result, it is possible to set up a measuring point and to perform collimation and the measurement of the measuring point automatically. The reduction of the measuring time, the improvement of the quality of working, and the increase of working efficiency are attained.

Also, the present invention provides a measuring method, wherein the image pickup unit has a reference optical axis, and the distance measuring optical axis is deflected with respect to the reference optical axis, and measurement is performed on the measuring point within the measurement range in a condition that the reference optical axis is fixed. As a result, there is no need to change direction of the measuring device and to move the measuring device, and measurement can be carried out on a multiple number of points in simple and easy manner.

Further, the present invention provides a measuring method, wherein a distance measurement is performed while micro-scanning of the distance measuring optical axis is performed around the measuring point. As a result, even when the measuring point is located on a ridge line or on a vertex, it is possible to perform measurement on the ridge line or on the vertex and to accurately measure the shape of an object to be measured.

Also, the invention provides the measuring device as described above, comprising a distance measuring unit for performing distance measurement on a measuring point by projecting a distance measuring light and by receiving a reflected distance measuring light from the measuring point, an image pickup unit for acquiring a digital image of a measurement range, a distance measuring optical axis deflecting unit for deflecting a distance measuring optical axis of the distance measuring light, an angle measuring unit for measuring an angle of the distance measuring optical axis, an image processing unit for extracting the measuring point through image processing of the digital image, and a control arithmetic unit, wherein the control arithmetic unit detects an angle of the measuring point on the digital image, controls the distance measuring optical axis deflecting unit based on the detected angle, directs the distance measuring optical axis toward the measuring point one after another and measures a distance to the measuring point. As a result, it is possible to set up the measuring point and to perform the collimation and the measurement of the measuring points automatically. The reduction of the measuring time, the improvement of quality of working, and the increase of working efficiency are attained.

Further, the invention provides the measuring device as described above, wherein the image pickup unit has a reference optical axis, and the distance measuring optical axis deflecting unit deflects the distance measuring optical axis with respect to the reference optical axis. As a result, it is possible to measure on a multiple number of points in simple and easy manner without changing the direction of the measuring device and moving the measuring device.

Also, the invention provides the measuring device as described above, wherein the distance measuring optical axis deflecting unit is a pair of MEMS mirrors provided at positions opposite to each other on the distance measuring optical axis, and the pair of MEMS mirrors have tilting direction deviated by 90° from each other. As a result, the distance measuring optical axis can be deflected in any direction as desired, and the deflection can be carried out at high speed.

Further, the invention provides the measuring device as described above, wherein the angle measuring unit has a luminous flux splitting means disposed on the distance measuring optical axis and a two-dimensional position detecting element for receiving the luminous flux thus split, wherein the two-dimensional position detecting element has a coordinate system having a point to match the distance measuring optical axis as an origin, and by detecting a position of the split luminous flux in the coordinate system, detects a deflection angle and a deflecting direction of the distance measuring optical axis. As a result, two-dimensional angle measurement can be performed at the same time, and it is possible to design the measuring device in smaller size.

Also, the invention provides the measuring device as described above, wherein a digital image of the measurement range is displayed on the display unit, the extracted measuring point are disposed in superimposed manner on the digital image, and a measuring point not yet measured and a measuring point already measured are discriminated from each other and are displayed. As a result, it is possible to visually confirm a progress of the measurement operation.

Further, the invention provides the measuring device as described above, further comprising a display unit, wherein the distance measuring light is a visible light, a digital image of the measurement range is displayed on the display unit, and a distance measuring light to be projected to the measuring point is displayed on the digital image. As a result, it is possible to visually confirm and judge the measuring position and the progress of the measuring operation.

BRIEF DESCRIPTION OF THE DRAWINGS

FIG. 5 (A) and FIG. 5 (B) each represents an illustration to explain a case where a measuring point is extracted from an taken image;

FIG. 6 is a schematical drawing to explain a case where a distance measuring light is divided by a ridge line;

FIG. 7 (A) is a schematical drawing to explain an example of the measuring method in case where the ridge line is detected when the measuring point is present on the ridge line, and FIG. 7 (B) is a schematical drawing to explain an example of measuring method in case where a vertex is detected when the measuring point is present on the vertex.

DETAILED DESCRIPTION OF THE PREFERRED EMBODIMENT

Description will be given below on an embodiment of the present invention by referring to the attached drawings.

Figure 1:
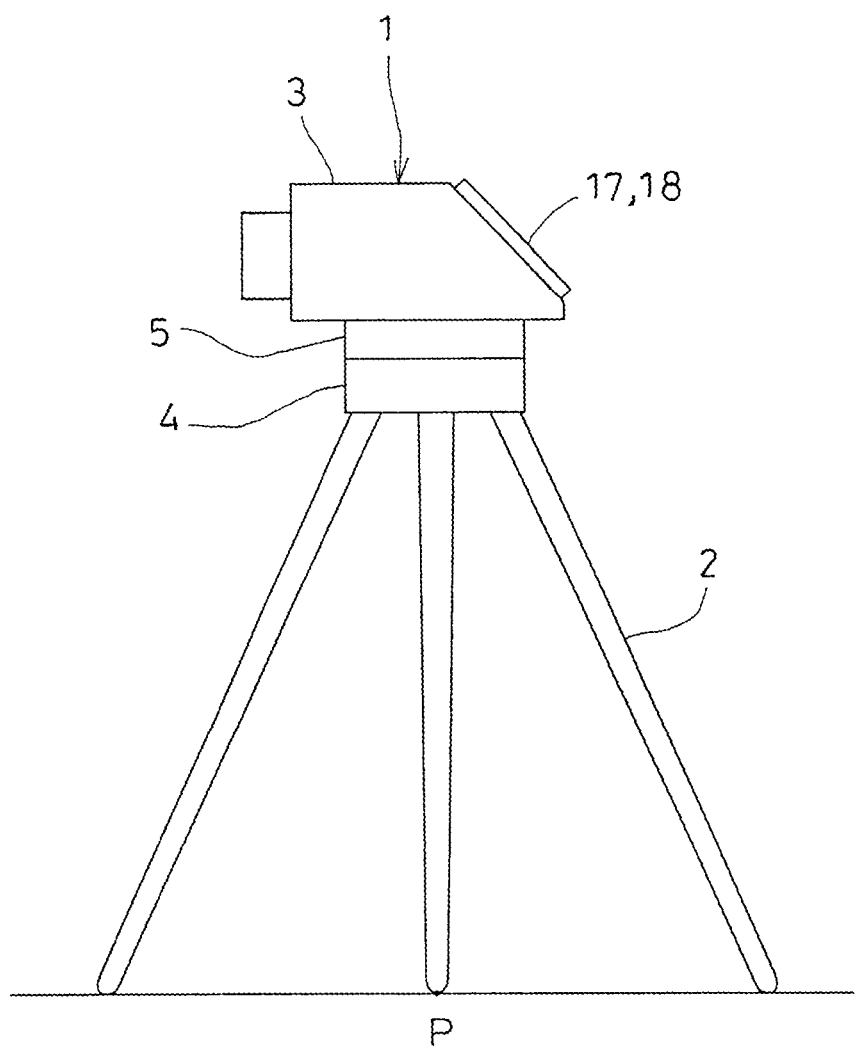
FIG. 1 is an external view of a measuring device according to an embodiment of the present invention.

First, referring to FIG. 1, description will be given on a measuring device, to which the present invention is applied.

The measuring device 1 is installed on a known point P via a support member such as a tripod 2. The measuring device 1 primarily comprises a measuring device main unit 3, a leveling unit 4, and a rotating unit 5. The leveling unit 4 performs leveling of the measuring device main unit 3 in horizontal state, and the rotating unit 5 can rotate the measuring device main unit 3 over total circumference, i.e. for 360° around a vertical axis.

Now, referring to FIG. 2, description will be given on an approximate system configuration of the measuring device main unit 3.

Figure 2:
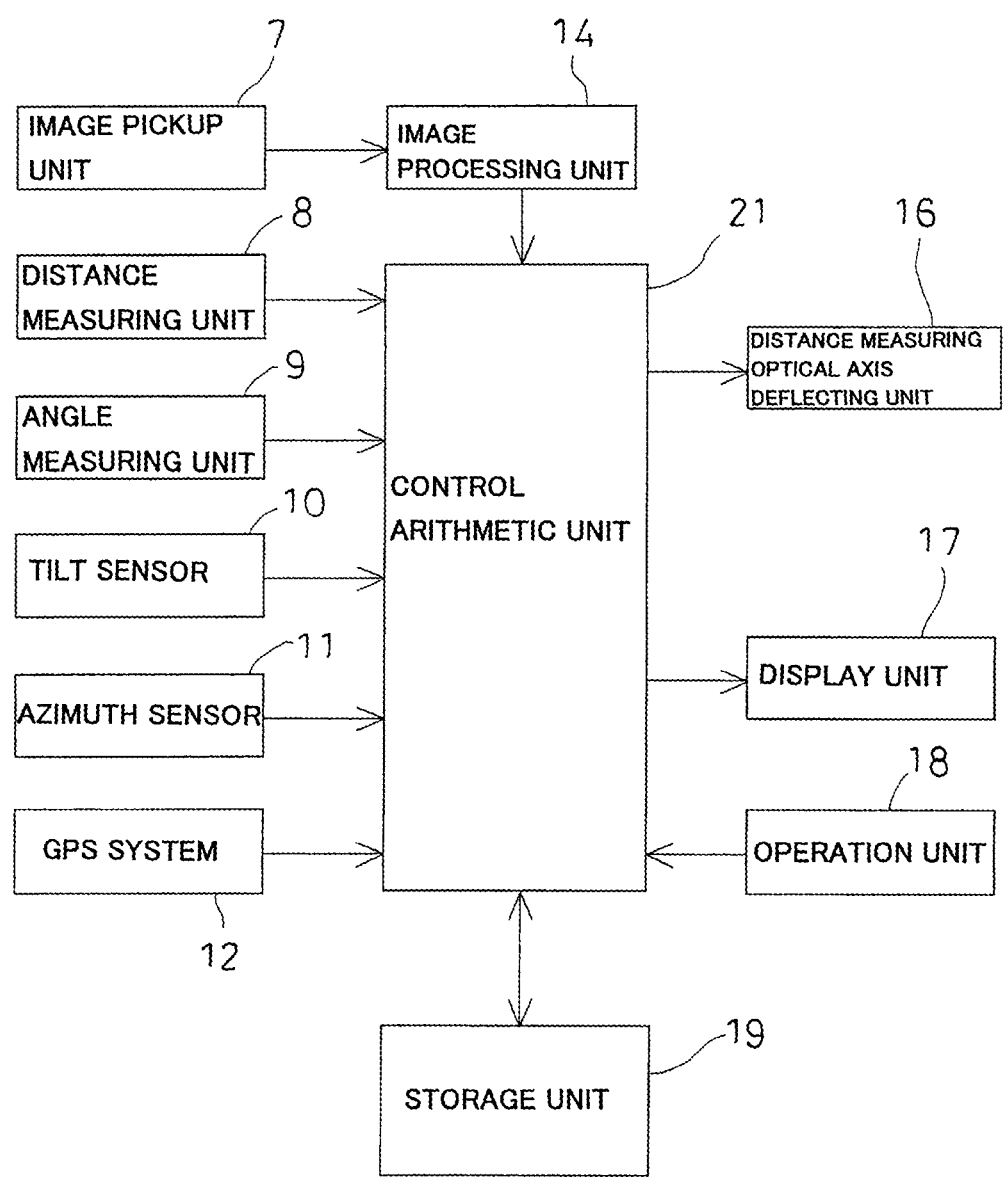
FIG. 2 is a schematical block diagram of the measuring device.

In FIG. 2, reference numeral 7 represents an image pickup unit for acquiring a digital image of the measurement range, numeral 8 represents a distance measuring unit for measuring a measuring point as set up in the measurement range, numeral 9 represents an angle measuring unit for detecting a direction of the measuring point, numeral 10 represents a tilt sensor for detecting a tilting of the measuring device main unit 3, numeral 11 represents an azimuth sensor for detecting an azimuth of the measuring device main unit 3, and numeral 12 represents a GPS system for measuring a position on a ground coordinate system of the measuring device main unit 3. Also, in FIG. 2, reference numeral 14 represents an image processing unit for extracting a measuring point by processing the image acquired by the image pickup unit 7, numeral 16 represents a distance measuring optical axis deflecting unit for directing the optical axis of the distance measuring light toward the measuring point, numeral 17 represents a display unit for displaying an image in the measurement range, or a condition where the measuring point is extracted, or a result of distance measurement, or a condition of progress of the measuring operation, etc., and numeral 18 represents an operation unit for carrying out setting-up of the measurement range, setting-up of the measuring condition, display operation to display results of detection, etc. The display unit 17 may be designed as a touch panel and may be used as the operation unit at the same time.

Further, in FIG. 2, reference numeral 19 represents a storage unit and numeral 21 represents a control arithmetic unit. The storage unit 19 has a program storage region and a data storage region. In the program storage region, various types of programs are stored: These programs include: a sequence program to make the measuring device main unit 3 carry out a series of measuring operation, an image processing program for performing image processing on the digital image as taken by the image pickup unit 7, for extracting a characteristic point as a measuring point, and for setting up ranking (order) on the extracted characteristic point, an angle measuring program for measuring field angles (a horizontal angle and a vertical angle) at an arbitrary point on the image, and other programs.

In the data storage region, the digital images acquired at the image pickup unit 7 are stored. Further, three-dimensional data (distance measurement data and angle measurement data) of the measuring points are associated to the corresponding characteristic points and are stored.

According to the sequence program, the image processing program, the angle measuring program, etc., the control arithmetic unit 21 executes image pickup by controlling the image pickup unit 7. Then, the control arithmetic unit 21 executes distance measurement and angle measurement by controlling the distance measuring unit 8 and the angle measuring unit 9. Further, the control arithmetic unit 21 performs image processing by controlling the image processing unit 14 and directs a distance measuring optical axis (to be described later) toward a predetermined direction by controlling the distance measuring optical axis deflecting unit 16. Then, based on the measured distance and the measured angle obtained for each of the measuring points, the control arithmetic unit 21 prepares three-dimensional data, and further, associates the data with the image.

Figure 3:
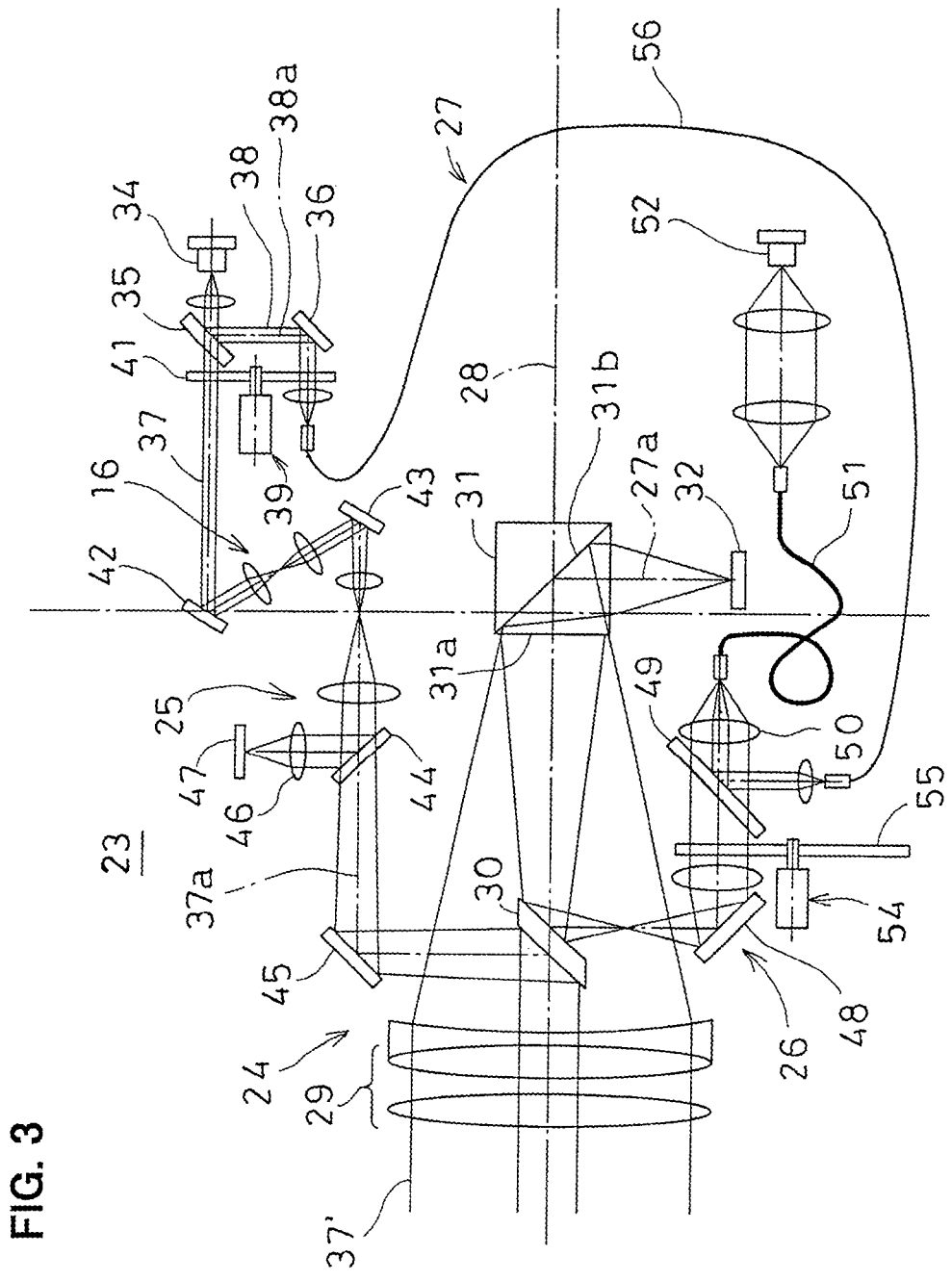
FIG. 3 is a schematical drawing to show an arrangement of one example of an optical system to be used in the measuring device.

FIG. 3 schematically shows an arrangement of an optical system 23, which is provided on the measuring device main unit 3. This optical system 23 includes optical systems of the image pickup unit 7 and the distance measuring unit 8. Further, the optical system 23 has a collimation optical system 24, a light projecting optical system 25, a light receiving optical system 26, and an internal reference optical system 27.

In FIG. 3, reference numeral 28 represents a reference optical axis of the optical system 23. The reference optical axis 28 is disposed in horizontal direction when the measuring device 1 is in a leveled condition.

Description will be given below on the collimation optical system 24.

An objective lens 29, a deflection mirror 30, and a reflection prism 31 are arranged along the reference optical axis 28. The reflection prism 31 has a first reflection surface 31a running perpendicularly to the reference optical axis 28, and a second reflection surface 31b tilted with respect to the reference optical axis 28. The first reflecting surface 31a is designed as a wavelength selecting film, and the first reflecting surface 31a is adapted to separate and reflect a reflected distance measuring light 37' (to be described later). The second reflection surface 31b separates a reflection optical axis 27a from the reference optical axis 28, and an image sensor 32 is installed along the reflection optical axis 27a.

When a visible light is used as a distance measuring light 37, the first reflecting surface 31a may be designed as a half-mirror so that the first reflecting surface 31a reflects a part of the reflected distance measuring light 37'.

As the image sensor 32, for instance, CCD or CMOS, etc., which is an aggregate of pixels, is used, and a position of each of the received pixels on a photodetecting surface (image pickup surface) can be specified. Further, a center of the image sensor 32 concurs with the reflection optical axis 27a. By determining a deviation from the reflection optical axis 27a and a direction of deviation based on a position of the pixel on the image sensor 32, a field angle of each pixel, i.e. a horizontal angle and a vertical angle of each pixel with respect to the reflection optical axis 27a, can be obtained.

The objective lens 29, the reflection prism 31, and the image sensor 32 make up together the collimation optical system 24 and also make up the image pickup unit 7. For instance, the field angle of the image pickup unit 7 is set to a predetermined angle ±20°.

Now, description will be given on the light projecting optical system 25.

In the light projecting optical system 25, reference numeral 34 represents a light emitting source. The light emitting source 34 emits the visible light or an non-visible light—preferably a laser beam of non-visible light as a distance measuring light.

By a half-mirror 35 and a mirror 36, the laser beam emitted from the light emitting source 34 is split to two lights, i.e. the distance measuring light 37 with a distance measuring optical axis 37a and an internal reference light 38 (to be described later) with an internal reference optical axis 38a. An optical path changeover unit 39 is provided to stride over an optical path of the distance measuring light 37 and an optical path of the internal reference light 38.

The optical path changeover unit 39 has an optical path selecting disk 41, which is designed as rotatable. On the optical path selecting disk 41, laser beam transmission holes (not shown) are provided at a predetermined pitch in circumferential direction. When one of the distance measuring light 37 and the internal reference light 38 passes through the laser beam transmission hole, it is so designed that the other of the distance measuring light 37 and the internal reference light 38 is intercepted by the optical path selecting disk 41. By rotating the optical path selecting disk 41, one of the distance measuring light 37 or the internal reference light 38 is alternatively selected.

Along the distance measuring optical axis 37*a*, a uni-dimensional deflection mirror 42 and a two-dimensional deflection mirror 43 are disposed at such positions as opposed to each other. The uni-dimensional deflection mirror 42 is tilted in a predetermined direction with respect to the distance measuring optical axis 37*a*, and the tilting angle can be controlled. The two-dimensional deflection mirror 43 is tilted in a direction perpendicularly crossing the uni-dimensional deflection mirror 42 with respect to the distance measuring optical axis 37*a*, that is, in a direction with a phase different by 90°. The two-dimensional deflection mirror 43 is so designed that the tilting angle can be controlled. Therefore, by controlling the tilting of each of the uni-dimensional deflection mirror 42 and the two-dimensional deflection mirror 43, an emitting direction of the distance measuring light 37 can be freely controlled in a two-dimensional direction with respect to the distance measuring optical axis 37*a* so that the emitting direction will be set with a tilt angle as desired within the range of the field angle of the collimation optical system 24.

The uni-dimensional deflection mirror 42 and the two-dimensional deflection mirror 43 make up together the distance measuring optical axis deflecting unit 16. As the uni-dimensional deflection mirror 42 and the two-dimensional deflection mirror 43, an MEMS (Micro Electro Mechanical System) mirror is used, for instance. When high frequency voltage is applied, the MEMS mirror is vibrated at high speed, and the reflection surface is reciprocally rotated at a micro-angle.

As the means to tilt the uni-dimensional deflection mirror 42 and the two-dimensional deflection mirror 43, a motor may be used to rotate these mirrors.

Along the distance measuring optical axis 37*a*, a half-mirror 44 is disposed as a luminous flux splitting means, and a distance measuring system deflecting mirror 45 is disposed as an optical axis deflecting means. By the distance measuring system deflection mirror 45, the distance measuring light 37 is reflected toward the deflection mirror 30. The distance measuring optical axis 37*a* of the distance measuring light 37, which is further reflected by the deflection mirror 30, will coincide with the reference optical axis 28.

Along the optical axis of the divided distance measuring light as divided by the half-mirror 44, a converging lens 46 and a two-dimensional position detecting element 47 are disposed, and the converging lens 46 is so arranged that the divided distance measuring light is converged on the two-dimensional position detecting element 47.

The two-dimensional position detecting element 47 is used to detect the optical axis of the divided distance measuring light, and a center of the two-dimensional position detecting element 47, (i.e. an origin of a two-dimensional coordinate axis formed on the two-dimensional position detecting element 47) is arranged to coincide with the optical axis of the divided distance measuring light under the condition that the uni-dimensional deflection mirror 42 and the two-dimensional deflection mirror 43 are at reference positions, i.e. under such condition that these do not deflect the distance measuring optical axis 37*a*.

The two-dimensional position detecting element 47 is CCD or CMOS, etc. which is an aggregate of pixels, for instance. A position of each of the received pixels on the photodetecting surface (image pickup surface) can be specified and by the light receiving position, a position of the optical axis of the divided distance measuring light, i.e. a horizontal angle and a vertical angle of the optical axis of the divided distance measuring light, can be obtained. Further, displacement of the optical axis of the divided distance measuring light, which is reflected by the half-mirror 44, corresponds to displacement of the distance measuring optical axis 37*a* on one-to-one basis. Thus, by means of detecting the horizontal angle and the vertical angle of the optical axis of the divided distance measuring light by the two-dimensional position detecting element 47, the horizontal angle and the vertical angle of the distance measuring optical axis 37*a* can be detected.

The two-dimensional position detecting element 47 fulfills the function as the angle measuring unit 9.

Next, description will be given on the light detecting (light receiving) optical system 26.

The distance measuring light 37 is projected on the reference optical axis 28 by the deflection mirror 30, and is projected to an object to be measured (not shown) through the objective lens 29. After being reflected by the object to be measured, the distance measuring light 37 enters the objective lens 29 as the reflected distance measuring light 37'. A part of the distance measuring light 37 is reflected by the first reflection surface 31*a*, and the reflected distance measuring light 37' as reflected is further reflected by the deflection mirror 30 and enters the light detecting optical system 26.

The light receiving optical system 26 has a light receiving system deflection mirror 48 which is disposed at a position opposite to the deflection mirror 30, and a half-mirror 49, a converging lens 50, and an incident end surface of optical fiber 51 are arranged respectively along the reflection optical axis of the light receiving system deflection mirror 48. The optical fiber 51 guides the reflected distance measuring light 37', which is entered from the incident end surface, toward a photodetection element 52.

A light quantity adjuster 54 is disposed between the light receiving system deflection mirror 48 and the half-mirror 49. The light quantity adjuster 54 is used to adjust light quantity of the reflected distance measuring light 37', which enters the optical fiber 51. As the light quantity adjuster 54, for instance, a light quantity adjusting filter 55 designed in disk-like shape, is used by rotating by means of a motor. The light quantity adjusting filter 55 is arranged at a position to cross the reflected distance measuring light 37', and a portion where the reflected distance measuring light 37' passes through is so designed that transmissivity of light is increased or decreased continuously or stepwise in circumferential direction. By rotating the light quantity adjusting filter 55, the light quantity of the reflected distance measuring light 37' entering the optical fiber 51 is adjusted so as to be constant or approximately constant. More concretely, it is adjusted so that the light quantity of the reflected distance measuring light 37' will be equal or approximately equal to the light quantity of the internal reference light 38.

Now, description will be given on the internal reference optical system 27.

The internal reference optical system 27 comprises the half-mirror 35, the mirror 36, an optical fiber 56 for internal reference light, the half-mirror 49, the optical fiber 51, the photodetection element 52, etc., and an optical path length of the internal reference optical system 27 is already known.

The internal reference light 38 as divided by the half-mirror 35 is reflected by the mirror 36, then, enters the optical fiber 56 for internal reference light, enters the half-mirror 49 through the optical fiber 56 for internal reference light, and further, passes through the optical fiber 51 and is received by the photodetection element 52.

The light projecting optical system 25, the internal reference optical system 27, etc. make up together the distance measuring unit 8.

Description will be given below on distance measuring operation in the above optical system.

A modulated laser beam is emitted from the light emitting source 34. After passing through the half-mirror 35, the laser beam is projected as the distance measuring light 37 through the optical path selecting disk 41. Then, the distance measuring light 37 is projected to the object to be measured (the measuring point) through the distance measuring optical axis deflecting unit 16, the distance measuring system deflection mirror 45, the deflection mirror 30, and the objective lens 29. Further, the reflected distance measuring light 37' reflected by the object to be measured enters through the objective lens 29. A part of the reflected distance measuring light 37' is reflected by the first reflecting surface 31a, and enters the light receiving optical system 26 through the reflection mirror 30 and is received by the photodetection element 52 after the light quantity is adjusted by the light quantity adjuster 54.

When the internal reference light 38 is selected by the optical path changeover unit 39, the internal reference light 38 is guided toward the half-mirror 49 through the optical fiber 56 for internal reference light, and further, is received by the photodetection element 52 after passing through the optical fiber 51.

A phase difference between the reflected distance measuring light 37' and the internal reference light 38, which are received by the photodetection element 52, is detected. Based on the phase difference, a distance to the measuring point is determined.

In the present embodiment, when measurement is performed on different measuring points, measurement is made under condition of fixing the reference optical axis 28. Because the distance measuring optical axis 37a can be deflected in any direction as desired by the distance measuring optical axis deflecting unit 16, the distance measuring optical axis 37a is deflected by the distance measuring optical axis deflecting unit 16 so as to direct toward the measuring point as desired. The direction of the distance measuring optical axis 37a is detected by the two-dimensional position detecting element 47 as to whether the distance measuring optical axis 37a is directed in a direction as desired or not.

In the measuring device 1 provided with the optical system 23, the collimation optical system 24 can measure a measuring point at an arbitrary position within the range of field angle without moving the measuring device 1 or without changing the collimating direction.

Figure 4:
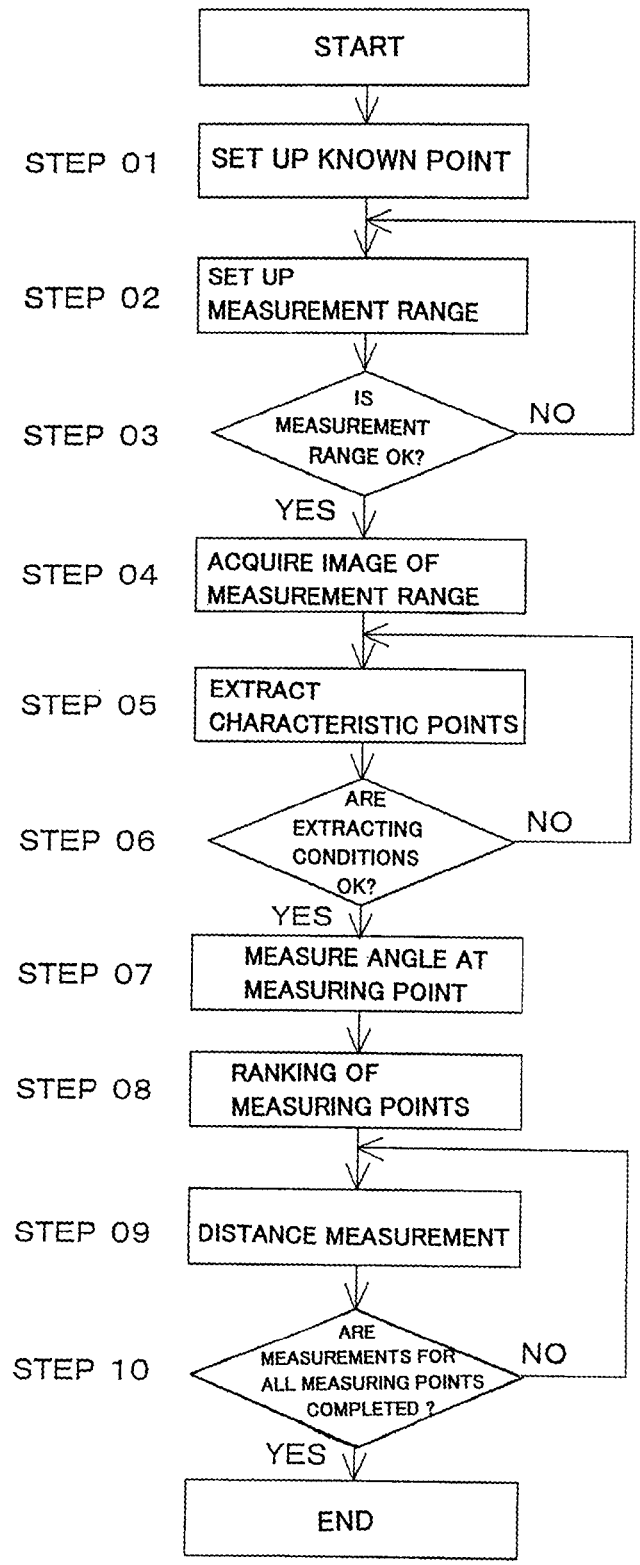
FIG. 4 is a flowchart to show an operation in the present embodiment.

Next, by referring to FIG. 4 and FIG. 5, description will be given on operation in the present embodiment.

(Step 01) The measuring device 1 is installed, and the data of the installed position are acquired as data of a known point, for instance, three-dimensional coordinates are acquired by the GPS system 12. In case the measuring device 1 is installed at a known point where the values of the coordinates are already known, or in case installation position is measured by other surveying instrument, positional data as obtained are set and inputted by the operation unit 18. In this case, the GPS system 12 may be omitted.

(Step 02 and Step 03) The reference optical axis 28 is directed in the measuring direction, and an image of the measurement range as acquired by the image sensor 32 is displayed on the display unit 17. It is confirmed whether the measurement range is adequate or not. If the measurement range is not adequate, the collimating direction is changed, and an adequate measurement range is set up.

When the measurement range is set up, automatic measuring operation is started.

(Step 04) An image in collimating direction (an image of the measurement range) is acquired by the image sensor 32 (FIG. 5 (A)).

(Step 05) The image thus acquired is outputted as a digital image signal from the image sensor 32. Image processing such as etching is performed at the image processing unit 14, and characteristic points A1, A2, A3, . . . are extracted (FIG. 5 (B)).

(Step 06) The extracted characteristic points are displayed and superimposed each other on an image of the measurement range. Then, extracting conditions of the characteristic points are confirmed. If the characteristic points are more than as necessarily required or are fewer than required, processing conditions such as adjustment of contrast at the time of etching processing are changed, and the conditions of extraction are adjusted.

(Step 07 and Step 08) When the extraction of the characteristic points is completed, the ranking of the extracted characteristic points are decided as the measuring points. Further, for the measuring points, horizontal angle and vertical angle are measured (angle measurement) based on the image from positions of pixels in the image sensor 32. The results of the angle measurement are associated with the data of each of the measuring points, and the data are stored in the storage unit 19.

(Step 09) Based on the ranking thus determined, distance measurement is performed on the measuring points one after another. The horizontal angle and the vertical angle stored in association with each of the measuring points are called in, and the distance measuring optical axis 37a is deflected by the distance measurement optical axis deflecting unit 16 so that the horizontal angle and the vertical angle will be consistent with the distance measuring optical axis 37a. The conditions of deflection, i.e. the horizontal angle and the vertical angle of the distance measuring optical axis 37a are detected by the two-dimensional position detecting element 47. When the horizontal angle and the vertical angle of the distance measuring optical axis 37a as detected by the two-dimensional position detecting element 47 are found to be consistent with the horizontal angle and the vertical angle as called in from the storage unit 19, the distance measurement is carried out. When the distance measurement is carried out for the measuring points, three-dimensional data can be acquired using the point of installation of the measuring device 1 as reference. Further, an azimuth angle of the reference optical axis 28 is acquired from the azimuth sensor 11. Then, based on the three-dimensional data of the point of installation, three-dimensional data at the absolute coordinates of the measuring point can be acquired. The three-dimensional data thus acquired are stored in the storage unit 19 after being associated with the measuring points.

The measuring points, for which the measurement has been completed, may be displayed and superimposed each other on the image of the measurement range so that the progress of the measuring operation can be identified. Or, it may be so designed that all of the measuring points are displayed on the image of the measurement range and the measuring points, which has been already measured, are identified and displayed by classifying the colors or by changing the lightness so that the progress of the measurement can be identified. If a visible light is used as the distance measuring light, the distance measuring light projected to the measuring points in the course of measurement appears on the image of the measurement range, and the state of the measurement condition and the state of progress can be confirmed.

(Step 10) When the distance measurement of the measuring point has been completed, the distance is measured in similar manner for the measuring point of the next ranking. When the measurement has been completed for all of the measuring points, the measurement operation is completed. The operations from the setting of the measuring points to the completion of measurement for all of the measuring points can be automated.

Further, when the measurement for wider range is carried out, the measuring device 1 is rotated in horizontal direction by the rotating unit 5. By carrying out the above-mentioned measurement operation, the measurement for total circumference can be automatically performed. In case the measurement in the range of the field angle of the optical system 23 would suffice, the rotating unit 5 may be omitted. Also, in case of indoor measurement and when absolute coordinates are not needed, the azimuth sensor 11 and the GPS system 12 may be omitted.

In many cases, the measuring points obtained by image processing such as edge processing are often on a ridge line or on a vertex. In case the measuring point is on the ridge line, the distance measuring light 37 is divided by a ridge line 58 as shown in FIG. 6. As a result, the reflected distance measuring lights 37' reflected by surfaces positioned at different distances enter the measuring device 1. This may cause errors in the results of measurement. Therefore, the measuring operation is carried out while performing micro-scanning reciprocally by using a measuring point 59 as a starting point (FIG. 7 (A)). Amplitude of the scanning should have such a value that at least the distance measuring light 37 is completely out of the ridge line 58. For instance, the amplitude of the scanning should be set to a value two times as long as a beam diameter D.

In case the measuring point 59 is the vertex, scanning is performed in spiral manner by using the measuring point 59 as the starting point, and measurement is carried out at a predetermined distance (FIG. 7 (B)). By performing the scanning in spiral manner, data of three planes with the measuring point 59 as the vertex can be acquired, and measurement can be made on a shape in detail near the measuring point 59. Therefore, by carrying out the distance measurement with micro scanning, the ridge line and the vertex can be measured in accurate manner.

In the embodiment as described above, explanation has been given on a measuring device 1 where the distance measuring optical axis 37a is tilted with respect to the reference optical axis 28, while the embodiment can also be carried out on a measuring device where the reference optical axis 28 and the distance measuring optical axis 37a are in the same relation or in a predetermined relation such as parallel position and the measuring device has a function to tilt the reference optical axis 28.

For instance, a total station has a collimation telescope, and also, a wide-angle telescope different from the collimation telescope. The collimation telescope has a distance measuring optical axis, and the wide-angle telescope has a reference optical axis, and the reference optical axis and the distance measuring optical axis are in a predetermined and fixed relation (e.g. in the parallel relation).

A total station has a function of tracking. The total station can make the collimation telescope and the wide-angle telescope rotate integrally in horizontal direction and in vertical direction, and can make the collimation telescope direct in the direction of the measuring point. If it is designed in such manner that an image pickup unit 7 (see FIG. 2) is installed on the wide-angle telescope, and further, an image processing unit 14 (see FIG. 2) etc. is installed, and that an image of the measurement range can be taken by the image pickup unit 7, and the measuring point is extracted from the image and angle measurement can be performed on the measuring point, it is possible to automatically perform the measurement on a multiple number of measuring points by simply setting up the measurement range.

Figure 8:
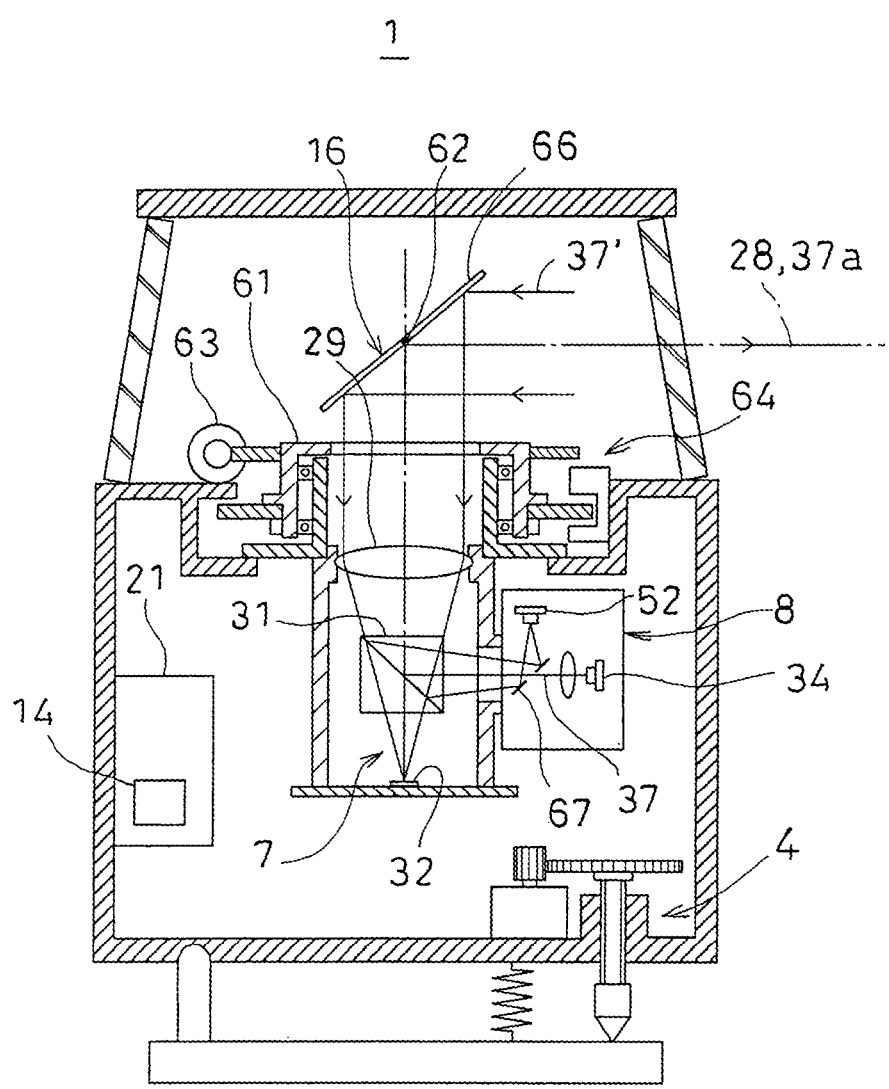
FIG. 8 is a schematical cross-sectional view of a measuring device according to another embodiment of the present invention.

FIG. 8 shows another embodiment of the present invention, which is carried out on another measuring device 1. In FIG. 8, the same component as shown in FIG. 1 to FIG. 3 is referred by the same symbol, and detailed description is not given here.

A distance measuring light 37 emitted from a light emitting source 34 is deflected in vertical direction by a reflection prism 31. Further, the distance measuring light 37 is deflected in horizontal direction by a deflection mirror 66 and is projected. After being reflected at the measuring point, a reflected distance measuring light 37' is reflected in vertical direction by the deflection mirror 66, is then reflected by the reflection prism 31, and further, is reflected by a reflection mirror 67 with aperture. Then, the reflected distance measuring light 37' is received by a photodetection element 52, and distance measurement is carried out by the reflected distance measuring light 37' thus received. An internal reference optical system 27 in a distance measuring unit 8 is not shown in the figure.

The image of the measurement range is reflected by the deflection mirror 66, and by using a visible light passing through the reflection prism 31, the image is taken by an image sensor 32.

The deflection mirror 66 is installed on a mirror holder 61, which can be rotated around the vertical axis. Further, the deflection mirror 66 is rotatable around a horizontal axis 62, which perpendicularly crosses the vertical axis. In FIG. 8, reference numeral 63 represents a motor, which rotates the mirror holder 61 in horizontal direction. A motor (not shown) is provided, which rotates the deflection mirror 66 in vertical direction via the horizontal axis 62.

Reference numeral 64 represents an encoder, which detects a horizontal rotation angle of the mirror holder 61. Also, an encoder is installed similarly, which detects a rotation angle in vertical direction of the deflection mirror 66.

In the another embodiment as described above, an image of the measurement range is acquired by the image sensor 32 via the deflection mirror 66. The distance measuring light 37 is projected through the deflection mirror 66, and the reflected distance measuring light 37' enters through the deflection mirror 66. In the another embodiment as described above, a reference optical axis 28 is the same as a distance measuring optical axis 37a.

In the another embodiment as described above, the deflection mirror 66 and the motor 63 make up together a distance measuring optical axis deflecting unit 16, and the encoder 64 and an encoder for detecting the rotation angle of the horizontal axis 62 make up together an angle measuring unit 9.

A control arithmetic unit 21 controls horizontal rotation and vertical rotation of the deflection mirror 66 and can direct the reference optical axis 28 toward the measuring point. The control arithmetic unit 21 has an image processing unit 14, which extracts measuring points from an image obtained by the image sensor 32.

In the another other embodiment as described above, the deflection mirror 66 can be rotated over total circumference. If an image is acquired in advance at a pitch of a predetermined rotation angle (an angle smaller than the field angle of the image pickup unit 7), an image for total circumference is prepared by synthesizing the image thus acquired, and the measuring point is extracted from the image of total circumference, and the measurement is performed sequentially on the measuring points thus extracted, it is possible to perform the measurement entirely automatically for the range of total circumference.

The invention claimed is:

1. A measuring method by using a measuring device, which comprises a distance measuring unit for performing distance measurement on a measuring point by projecting a distance measuring light and by receiving a reflected distance measuring light from the measuring point, an image pickup unit, having a reference optical axis, for acquiring a digital image of a measurement range, a distance measuring optical axis deflecting unit for deflecting a distance measuring optical axis of said distance measuring light, wherein said distance measuring optical axis is deflected with respect to said reference optical axis, and an image processing unit for extracting the measuring point by image processing of said digital image, comprising:

acquiring a digital image of said measurement range, extracting the measuring point through image processing of the acquired digital image, measuring an angle of each of the measuring points from the image, and directing said distance measuring optical axis to each of the measuring points one after another based on the result of angle measurement, and measuring a distance to each of the measuring points, wherein measurement is performed on each of the measuring points within said measurement range in a condition that said reference optical axis is fixed.

2. A measuring method according to claim 1, wherein a distance measurement is performed while micro-scanning of said distance measuring optical axis is performed around the measuring point.

3. A measuring method according to claim 1, further comprising setting a measuring order of the measuring points based on a result of said angle measurement, and wherein directing said distance measuring optical axis to each of the measuring point one after another is based on said result of said angle measurement and said measuring order.

4. A measuring device, comprising a distance measuring unit for performing distance measurement on a measuring point by projecting a distance measuring light and by receiving a reflected distance measuring light from the measuring point, an image pickup unit, having a reference optical axis, for acquiring a digital image of a measurement range, a distance measuring optical axis deflecting unit for deflecting a distance measuring optical axis of said distance measuring light, wherein said distance measuring optical axis deflecting unit deflects said distance measuring optical axis with respect to said reference optical axis, an angle measuring unit for measuring an angle of said distance measuring optical axis, an image processing unit for extracting the measuring point through image processing of said digital image, and a control arithmetic unit, wherein said control arithmetic unit detects an angle of the measuring point on said digital image, controls said distance measuring optical axis deflecting unit based on the detected angle, directs said distance measuring optical axis toward the measuring point one after another and measures a distance to the measuring point.

5. A measuring device according to claim 4, wherein said distance measuring optical axis deflecting unit is a pair of MEMS mirrors provided at positions opposite to each other on said distance measuring optical axis, and said pair of MEMS mirrors have tilting direction deviated by 90° from each other.

6. A measuring device according to claim 4, wherein said angle measuring unit has a luminous flux splitting means disposed on said distance measuring optical axis and a two-dimensional position detecting element for receiving the luminous flux thus split, wherein said two-dimensional position detecting element has a coordinate system having a point to match said distance measuring optical axis as an origin, and by detecting a position of the split luminous flux in said coordinate system, detects a deflection angle and a deflecting direction of said distance measuring optical axis.

7. A measuring device according to claim 4, further comprising a display unit, wherein a digital image of said measurement range is displayed on said display unit, the extracted measuring point are disposed in superimposed manner on said digital image, and a measuring point not yet measured and a measuring point already measured are discriminated from each other and are displayed.

8. A measuring device according to claim 4, further comprising a display unit, wherein said distance measuring light is a visible light, a digital image of said measurement range is displayed on said display unit, and a distance measuring light to be projected to the measuring point is displayed on said digital image.

9. A measuring device according to claim 4, wherein said distance measuring unit has said distance measuring optical axis, said image pickup unit has a reference optical axis, wherein said distance measuring optical axis and said reference optical axis are disposed in a fixed relation with each other, said distance measuring optical axis and said reference optical axis are integrally deflected, and said distance measuring optical axis is directed to the measuring point.

10. A measuring device according to claim 4, wherein an optical axis of said image pickup unit commonly shares said distance measuring optical axis, a deflection mirror is installed on the optical axis portion commonly shared, and when said deflection mirror is rotated in horizontal direction and is rotated in vertical direction, said distance measuring optical axis is deflected.

11. A measuring device according to claim 4, wherein said control arithmetic unit sets a measuring order of the measuring points based on the detected angle, and controls said distance measuring optical axis deflecting unit based on the detected angle and the measuring order.

* * * * *